(12) United States Patent
Mazzio

(10) Patent No.: US 7,907,274 B2
(45) Date of Patent: Mar. 15, 2011

(54) METHOD FOR CHARACTERIZING X-RAY DETECTOR MATERIALS USING A RAMAN MICROSCOPE

(75) Inventor: Victor Mazzio, West Chester, PA (US)

(73) Assignee: Hologic, Inc., Marlboro, MA (US)

(*) Notice: Subject to any disclaimer, the term of this patent is extended or adjusted under 35 U.S.C. 154(b) by 244 days.

(21) Appl. No.: 12/179,265

(22) Filed: Jul. 24, 2008

(65) Prior Publication Data

US 2010/0020317 A1 Jan. 28, 2010

(51) Int. Cl.
*G01J 3/44* (2006.01)
(52) U.S. Cl. .......................... 356/301; 356/326
(58) Field of Classification Search .................. 356/326, 356/301–303, 237.1–237.3, 72
See application file for complete search history.

(56) References Cited

U.S. PATENT DOCUMENTS

| | | | |
|---|---|---|---|
| 6,067,154 A * | 5/2000 | Hossain et al. | 356/237.2 |
| 6,337,472 B1 * | 1/2002 | Garner et al. | 250/201.3 |
| 6,744,500 B2 * | 6/2004 | Bradbury et al. | 356/301 |
| 7,034,930 B1 * | 4/2006 | Subramanian et al. | 356/237.2 |

* cited by examiner

*Primary Examiner* — L. G Lauchman
(74) *Attorney, Agent, or Firm* — Lindsay McGuinness

(57) ABSTRACT

An improved Raman microspectrometer system extends the optical reach and analysis range of an existing Raman microspectrometer to allow analysis and/or repair of an oversized sample. The improved Raman microspectrometer system includes an extender for extending the optical reach of the existing microspectrometer and a supplemental stage which extends the analysis range of the existing microspectrometer by providing travel capabilities for non-destructive analysis of an entire oversized sample. Such an arrangement decreases manufacturing costs associated with testing oversized samples such as mammography panels, enabling analysis and/or repair to be performed without destruction.

14 Claims, 12 Drawing Sheets

METHOD FOR CHARACTERIZING X-RAY DETECTOR MATERIALS USING A RAMAN MICROSCOPE

FIELD OF THE INVENTION

This invention relates generally to the field of micro-spectrometry and more particularly to a non-destructive method and apparatus for identifying, analyzing and repairing digital imaging panels using a microspectrometer.

BACKGROUND OF THE INVENTION

FIG. 1 illustrates a typical Raman microspectrometer 10. The Raman microspectrometer 10 includes an optical microscope 20, coupled via supports 32 and 34 to a combined excitation laser source/spectrometer 30. The Raman microspectrometer is used to analyze the molecular structure of a sample that is disposed on the microscope stage 22. During analysis the sample is secured to the stage 22 and laser beam pulses are directed via the optical transfer tube 33 through the lens of the microscope 20 onto points in the sample. Resulting Raman and Rayleigh scatter from the sample is forwarded back through the microscope lens and optical transfer tube 33 to the spectrometer. The spectrometer filters out the Rayleigh scattered energy and separates the wavelengths of the Raman scattered energy to identify the molecular structure at examined points of the sample.

The stage 22 on which the sample is disposed is motor controlled by the joystick 15 to provide movement (i.e., travel) of the stage along the x, y and z axis to thereby allow analysis of each point in the sample. In general, the size of the stage is designed to accommodate slides and/or semiconductors or other types of samples for which Raman Microspectroscopy has been shown to be appropriate. For example, the stage of the microspectrometer in FIG. 1 has a four inch by four inch x/y travel capability, which is generally sufficient to examine any sample that fits within the stage.

However it is sometimes desirable to perform Raman analysis on samples having a size that exceeds that of an existing optical microscope stage. An example of such a sample is a digital mammography panel that is used in x-ray imaging systems, also referred to as a flat panel detector. Flat panel detectors may be comprised of a thin film transistor layer coated with one or more material layers including a photoconductive layer such as amorphous selenium. Exemplary layers of a flat panel detector 50 are shown in FIG. 2 to include a top electrode 52, a charge barrier layer 53 (typically made of Parylene-N) separating the top electrode from an amorphous selenium-based charge generator layer 54, and a charge collection electrode layer 55 disposed upon a thin-film transistor ("TFT") array 56.

Under normal operation, before exposure to x-ray radiation, the photoconductive layer is uniformly biased relative to electrical charge readout means by application of a biasing field via voltage source 58. As x-rays are directed at the panel, electrons move from the valence band to the conduction band thereby creating holes where electrons once resided. Electron-hole pair charges move in opposite directions along electric field lines towards opposing surfaces of the photoconductive layer. Holes collected by the electrode 55 are used to charge capacitors in the TFT array 56 which may subsequently be read out to provide a latent image.

The accuracy of image capture is thus highly dependent upon the ability of the electron hole pairs to travel freely within the photoconductive layer. However anomalies in the manufacturing process may give rise to defects within the amorphous selenium that impair the free movement of electron hole pairs. For example, temperature changes or other processing procedures may cause crystals to be generated in the selenium. Before the panel may be released for commercial use, it is necessary to perform a series of tests on the panel to ensure that the panel is free from such anomalies.

Panel testing may identify spatial coordinates of one or more problems in the panel. A Raman microspectrometer is preferably used to determine the molecular structure at the coordinate of interest. However it is difficult to use existing Raman microspectrometers to analyze digital image panels in their entirety because the size of the flat panel cannot be accommodated by the existing stage and travel capabilities of the microspectrometer. Digital mammography panels may measure more than eleven by nine inches, while the travel distance of available microspectrometer stages are only four inches or less in each dimension. In addition, even if the travel of the existing stage could be adjusted, the physical space constraints between the microscope 20, optical transfer tube 33, and spectrometer 30 limit the ability to properly examine the entire panel.

As a result, inspection of problem coordinates of a mammography panel requires destruction of the panel. Panels are cut into discrete sections that can be examined using the current stage travel capabilities. After destruction, a technician would iteratively step through each pixel position of each panel section to locate and analyze anomalies caused by the manufacturing processes. This process was time consuming, destructive and concomitantly expensive. It would be desirable to identify a non-destructive apparatus and method for analyzing oversized samples using microspectrometers.

SUMMARY OF THE INVENTION

According to one aspect of the invention, a method for performing spectroscopy of a sample using a microspectrometer is described. The present invention enables spectroscopy to be performed across a desired analysis range that exceeds at least one of a size and travel capability of a stage of the microspectrometer to thereby allow analysis of oversized samples such as mammography panels using the existing microspectrometer hardware and software. The he method comprising the steps of controlling movement of a supplemental stage coupled to the microspectrometer to position an extended optical path of the microspectrometer over a point in the desired analysis range, wherein the sample is supported by the supplemental stage and wherein the movement of the sample enables spectral analysis of the sample at the point. The microspectrometer is then controlled to emit at least one laser pulse onto the point of the sample on the optical path and to perform spectral analysis of scatter wavelengths received in response to the laser pulse via the optical path. Such a process enables spectral analysis of oversized samples without destruction of the sample.

According to another aspect of the invention, a method for repairing a defect in an oversized sample using a microspectrometer is described, wherein: the oversized sample exceeds a travel capability of a stage of the microspectrometer in at least one dimension. The oversized sample is positioned in a supplemental stage proximate to the microspectrometer and an optical reach of the microspectrometer is extended to dispose an extended optical path of the microspectrometer over the supplemental stage. The method including the steps of controlling movement of the supplemental stage to position the extended optical path of the microspectrometer over a defect in the sample and controlling the microspectrometer to irradiate the defect via the extended optical path. With such an arrangement, defects such as crystallized selenium in a mammography panel may be repaired to return amorphousness to the photoconductive layer using existing microspectrometer hardware and software.

DETAILED DESCRIPTION

According to one aspect of the invention, an improved Raman microspectrometer system extends the optical reach and analysis range of an existing Raman microspectrometer to allow analysis and/or repair of an oversized sample. For the purposes of this application, an oversized sample shall mean any sample that exceeds the travel capabilities of an existing stage of the existing Raman microspectrometer in any one of an x, y or z dimensions. The improved Raman microspectrometer system includes an extender for extending the optical reach of the existing microspectrometer and a supplemental stage which extends the analysis range of the existing microspectrometer by providing travel capabilities for non-destructive analysis of an entire oversized sample. Such an arrangement decreases manufacturing costs associated with testing oversized samples such as mammography panels, enabling analysis and/or repair to be performed without destruction. In addition, as will be described further below, such an arrangement increases the speed and accuracy of defect analysis and repair because it allows coordinate information received from a panel testing procedure to be used by software to quickly and accurately pinpoint problem areas in the panel.

Figure 1:
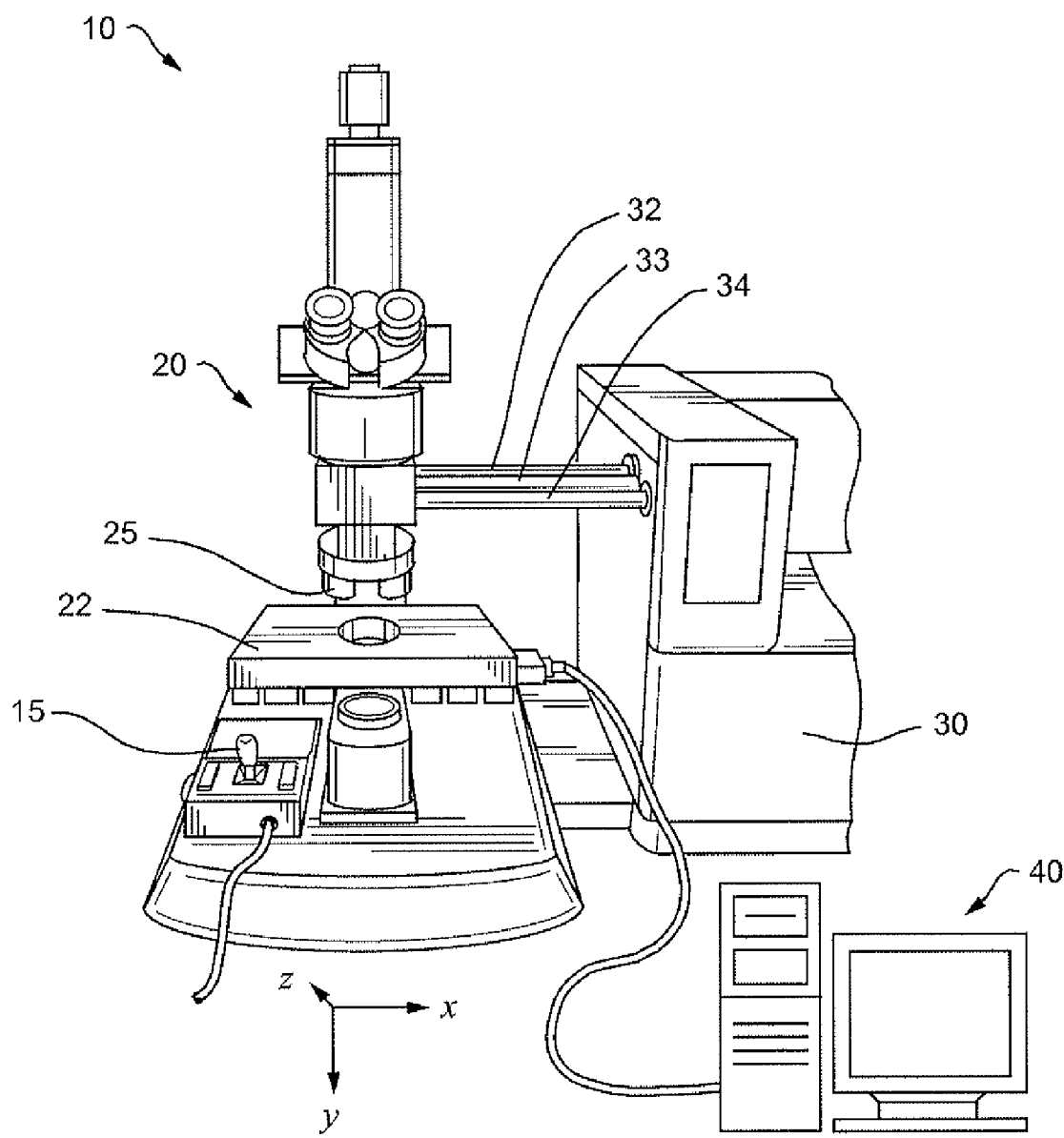
FIG. 1 is a diagram illustrating a prior art Raman microspectrometer.
Figure 2:
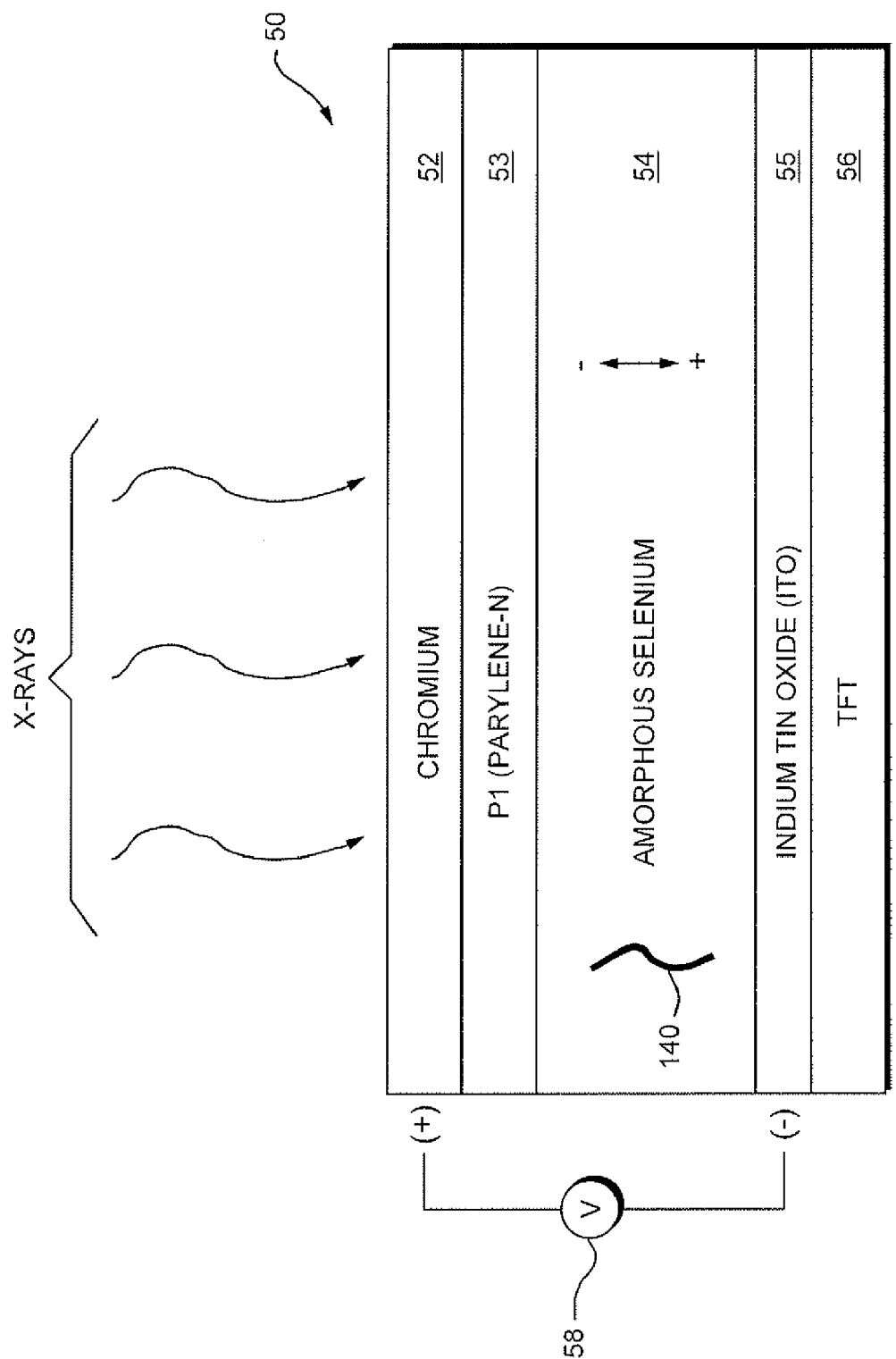
FIG. 2 is a cross section illustration of an exemplary digital mammography imaging panel.
Figure 3:
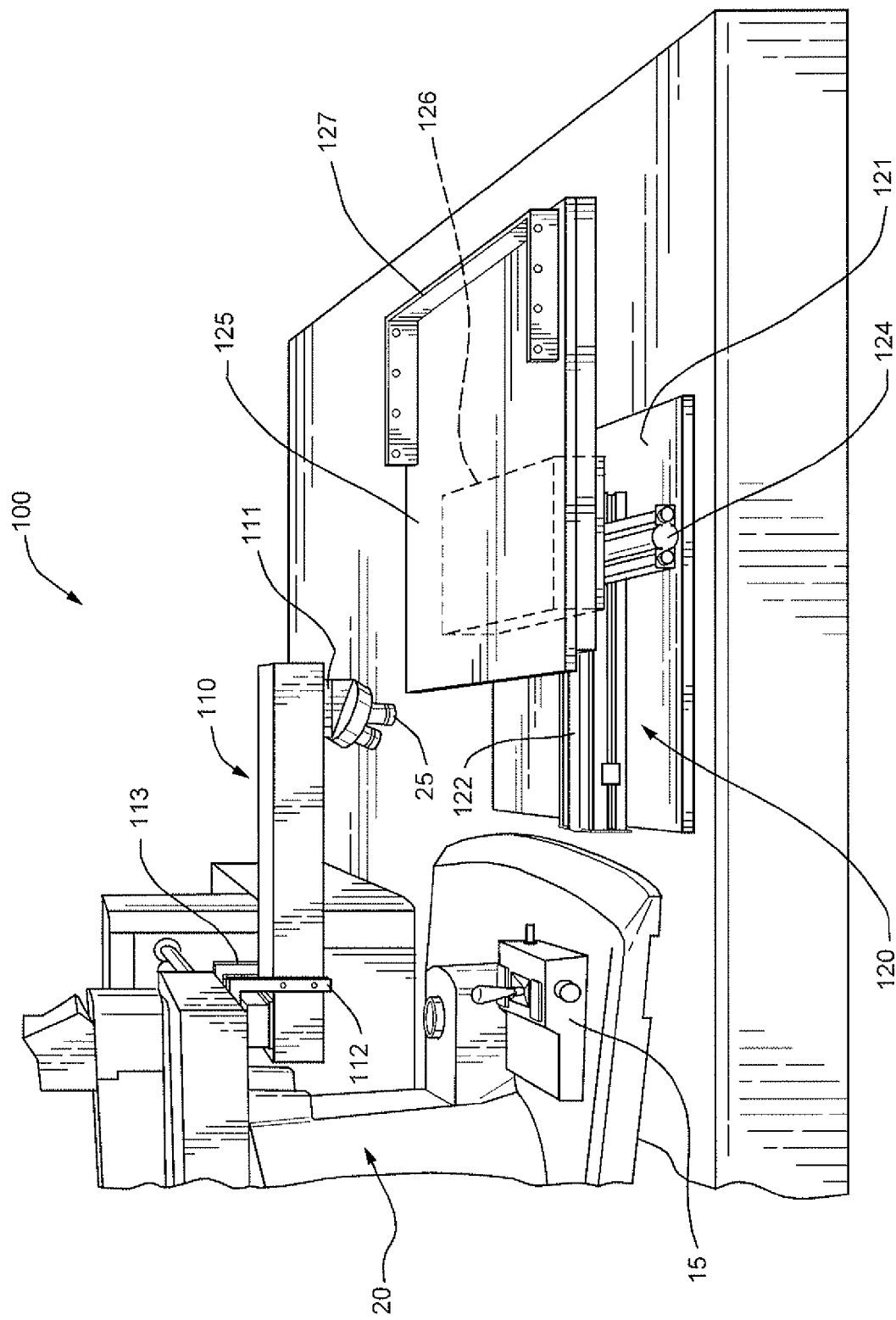
FIG. 3 is a diagram of an improved Raman microspectrometer system of the present invention for use in analyzing and/or repairing oversized samples such as mammography imaging panels.

FIG. 3 illustrates one embodiment of a Raman microspectrometer system 100 of the present invention. The embodiment 100 includes an extender 110 which mounts onto an optical microscope 20. In a preferred embodiment, the extender 110 includes, or has attached thereto, a coupling device (such as a mounting plate) adapted for connection to a turret mount of the microscope 20 (not shown). The mounting plate allows the extender to easily attach to the microscope in place of the turret 25. In FIG. 3 the extender is shown to extend generally perpendicular to a y axis defined by the microscope although this is not a requirement of the invention.

The extender includes a housing having a proximal orifice (not viewable in FIG. 3) which is positioned to receive light from the optical microscope lens when the extender is attached to the optical microscope. The housing also includes a distal orifice which is positioned to enable the light waves from the optical microscope to be directed towards a sample to be analyzed. For example, in the arrangement of FIG. 3, the housing comprises an upper surface and a lower surface, the proximal orifice extends into the housing through the upper surface and the distal orifice extends into the housing at the distal end of the lower surface. As will be described in further detail with regard to FIGS. 5-7, two or more mirrors are disposed within the housing for directing light waves between the lens of the optical microscope and a sample that is positioned below the distal orifice.

In one embodiment, optical signals pass between mirrors via a fluid. The fluid may include air as well as other gases, such as helium, nitrogen, argon, etc. Other waveguide materials having various refractive indices known to those of skill in the art may be substituted herein without affecting the scope of the invention. Such materials include but are not limited to plastic, liquid or glass fiber or bundle of fibers.

A turret mount 111 may advantageously be positioned over the distal orifice to enable attachment of a turret 25 comprising one or more magnification lenses into the optical path. Although a turret is shown, it should be appreciated that the design allows any lens arrangement to be used at the distal orifice, and the present invention is not limited to the use of a lens turret.

One or more suspension arms 112, 113 may be used to provide further support for the housing. It can be appreciated that the extender adds an additional, unanticipated weight to the turret mount of the optical microscope which may not have been anticipated by the designer of the microscope; the suspension arms may be used to relieve stress on the turret mount that is caused by the added weight of the extender. In the embodiment of FIG. 3, the suspension arms 112, 113 are mounted and designed in accordance with a shape of the body of the microscope to enable the suspension arms to hang from the lens housing of the optical microscope. It should be noted that the illustrated embodiment is representative of only one manner of relieving stress on the turret mount, other methods of bracing known in the art are considered as equivalents to the suspension arms and thus within the scope of the present invention. It should further be noted that the suspension arms are advantageous, but not a necessary element of the present invention.

The improved Raman microspectrometer system 100 also includes a supplemental stage 120. The supplemental stage 120 is a motorized stage adapted to travel in an x and y direction along tracks 122 and 124. A motor 126 is disposed above the rails to control the movement of the tray in the x and y direction, and further includes a lift mechanism for movement of the stage in the z direction.

The supplemental stage 120 further includes a tray 125 which is used to mount and secure the sample for analysis and/or repair. In general the size of the stage and the length of the rails should be selected to support and allow complete analysis of the desired oversized sample. For example, a supplemental stage for analysis and/or repair of digital mammography panels may have a z dimension travel of one inch and include 12 inch horizontal and vertical rails upon which is mounted a 12"×12" tray.

In the embodiment of FIG. 3 the supplemental stage 120 is shown mounted on a support panel 121 which disperses the overall weight of the system to control tipping or other movement of the system during operation. In FIG. 3 the tray is shown to include a mount 127 for securing a digital mammography panel to the tray. In one embodiment, the tray 125 may be swappable to accommodate different sizes and types of oversized samples using a common travel system.

According to one aspect of the invention, movement of the supplemental stage is controlled by the joystick 15 of the existing stage 22 via a Programmable Multi-Access Controller (PMAC) or similar device having the power to drive a larger stage. The PMAC may accept both manual input (i.e., from joystick 15) and computerized input (i.e., from system software). The PMAC is thus used to move the tray to position a coordinate of the sample beneath the extended optical path. As will be described in more detail later herein, software drivers cooperate to coordinate travel of the supplemental stage and analysis of the oversized sample such that existing software analysis tools can be used without modification.

There are several benefits provided by the system of the present invention. Extending the optical reach of a Ram an microscope beyond its manufactured position increases its overall utility by eliminating sample size limitations associated with physical constraints of the microspectrometer components. The use of the microspectrometer is therefore not limited to merely post-destruction investigation of defects, but now may be integrated into a panel verification and repair process.

Figure 4:
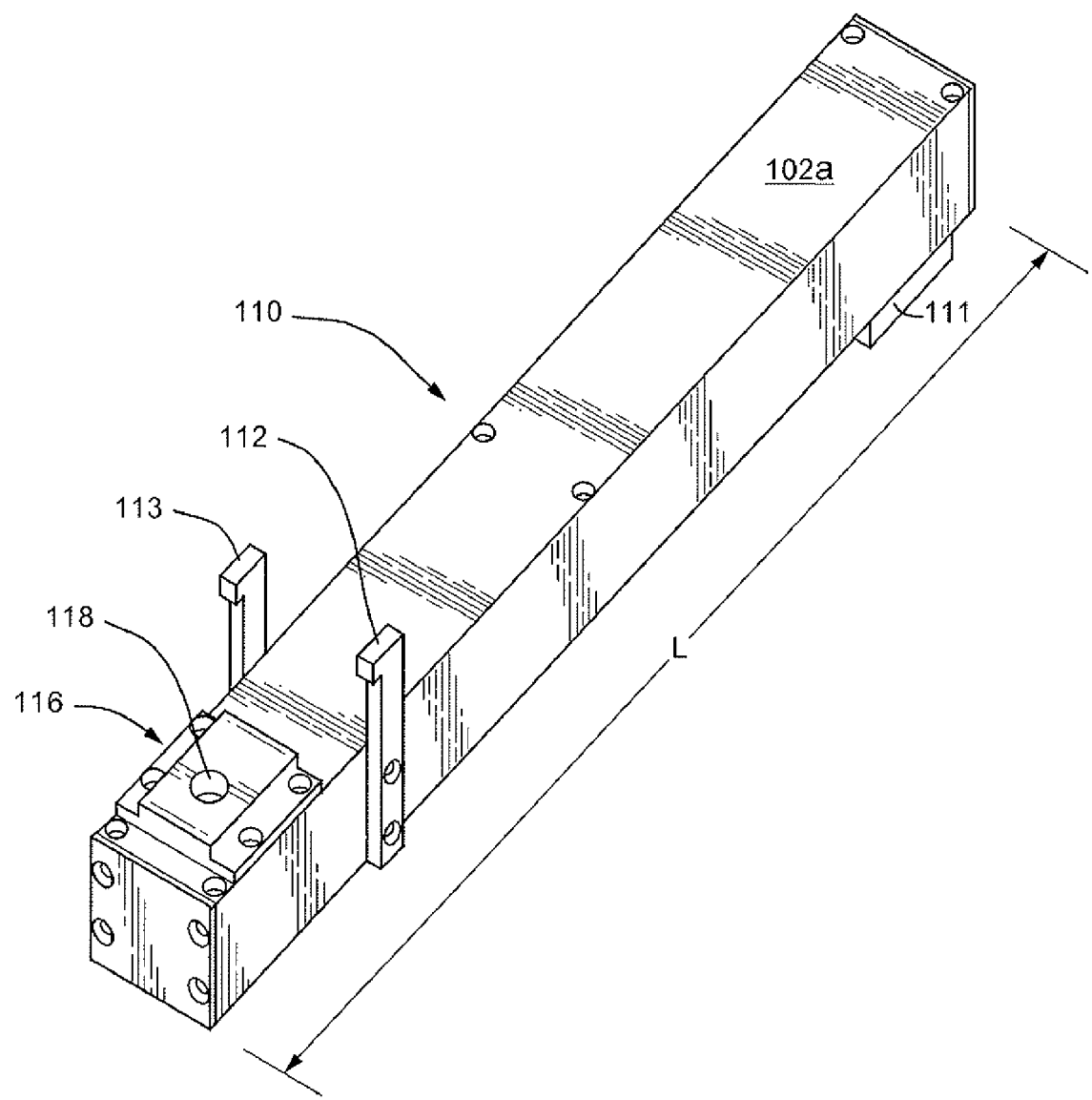
FIG. 4 is a diagram of a Raman microscope extender of the present invention.

FIG. 4 illustrates the exemplary extension 110 in increased detail. In this embodiment, the extension comprises a rectangular housing formed of aluminum with a black anodize finish. A stainless steel mounting plate 116 having an opening extending there-through is positioned on a top surface 102A over the proximal orifice 118. Suspension arms 112, 113 are affixed to the sides of the housing, proximate to the mounting plate, to provide additional support and relief of stress to the mounting plate/turret mount pair. A turret mount 111 (or other lens mounting coupling device) is positioned on a bottom surface 102B (not shown) of the extender. In general the turret mount 111 (or other lens mount) may conform to the turret mount of the microscope 20 although this is not a requirement, and it is appreciated that there are a variety of turrets available in the art. Further, although the mounting plate 116 and turret mount 111 are shown as welded pieces for the extension, in other embodiments it is envisioned that one or more of the turret mounts and mounting plates may be removable to facilitate use of the extender 110 with different microscopes and turrets. In addition, although the mounting plate 116 is shown fixed to the extender 110, other embodiments are envisioned wherein the mounting plate rotates around the proximal orifice to enable rotation of the extender 110.

As will be discussed in more detail later herein it should be appreciated that FIG. 4 illustrates only an exemplary embodiment, and multiple different extension embodiments capable of extending an optical reach are contemplated. For example, although a generally rectangular shape is shown the present invention is not limited to the extension having any particular shape characteristics; for example the extension may be shaped as a tube, or include fewer or greater angles. Although the extension is shown comprised of multiple mated pieces, it is appreciated that various parts, or all, of the extension may comprise a unitary piece. Although the extension of FIG. 4 is shown as a fixed, rigid piece, as will be described later herein other embodiments, wherein the extension is flexible, telescoping or rotatable are contemplated. Although certain finishes and materials are described, there are no particular limitations to the material or finish of the extension. In short, any device that is capable of establishing an optical channel between a first orifice and a second orifice can be substituted herein without affecting the scope of the present invention.

Figure 5A:
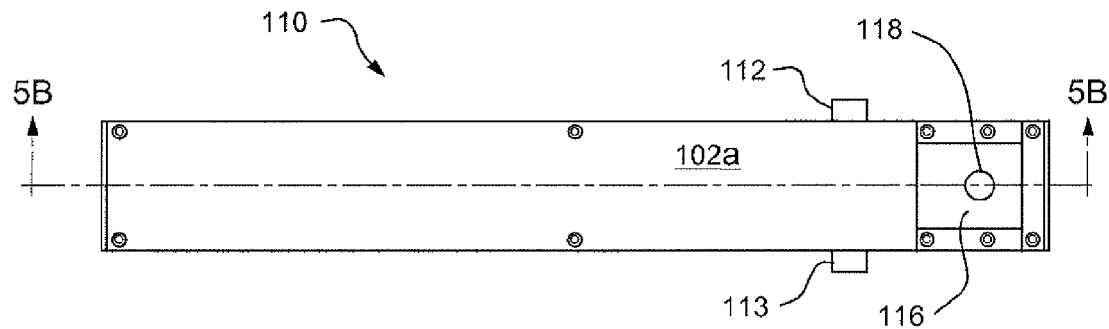
FIG. 5A is a top perspective view of the Raman microscope extender of FIG. 4.
Figure 5B:
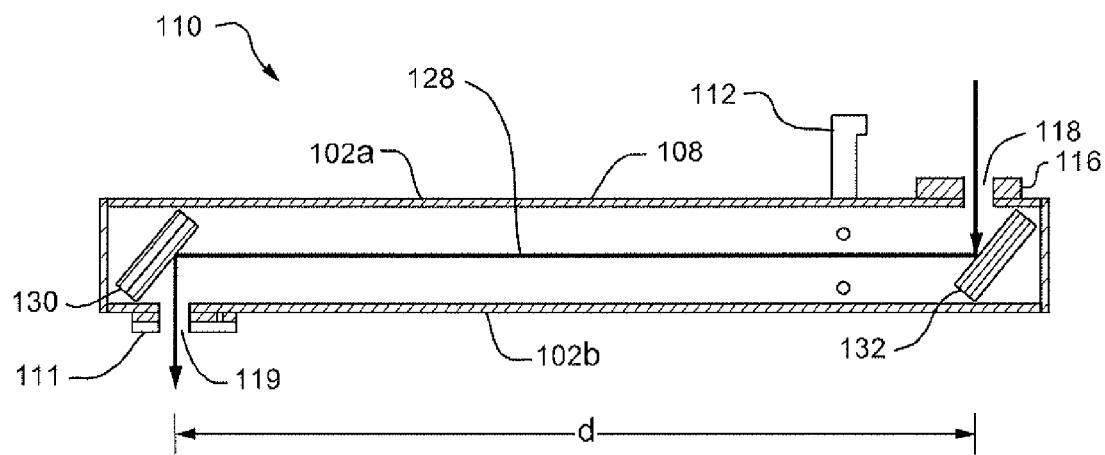
FIG. 5B is a cross section view of the Raman microscope extender taken along line B of FIG. 5A.

FIGS. 5A and 5B comprise top perspective view and a cross section view of the extender 110. The cross section view of FIG. 5B is taken along line B of FIG. 5A. As shown in FIG. 5B, at least a pair of mirrors is positioned inside the housing. In a preferred embodiment, each of the mirrors is positioned at a 45 degree angle relative to its opposing orifice. The proximal mirror 132 is positioned to exchange light waves between the lens of the microscope and the distal mirror 130. The distal mirror is positioned to exchange light waves between the proximal mirror 132 and the sample (not shown). The interior walls of the housing 108 are preferably coated with a non-reflective coating. Together the orifices, 118, 119, housing 108 and mirrors 132 and 130 define an optical channel for performing Raman analysis.

Figure 6:
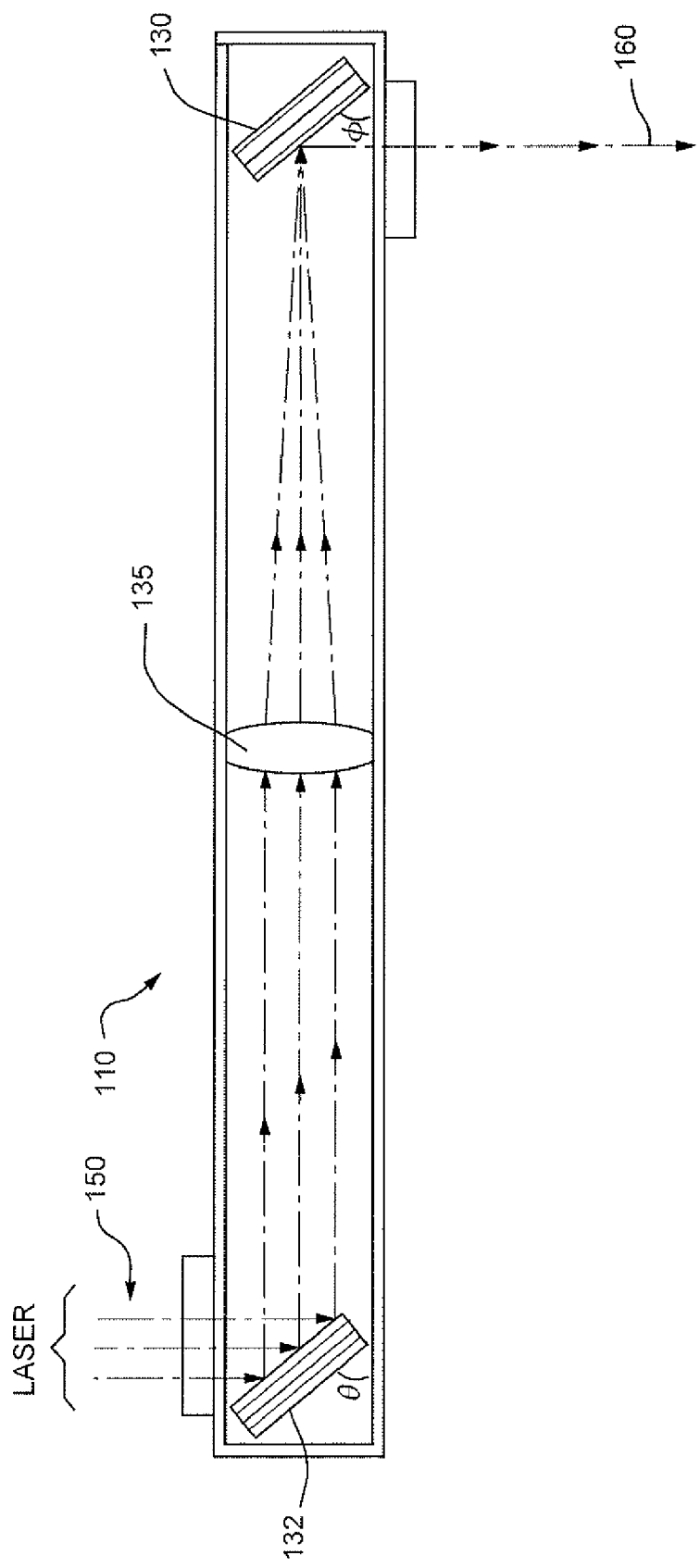
FIG. 6 is cross section view of the Raman extender illustrating a path of laser pulses through the extender.
Figure 7:
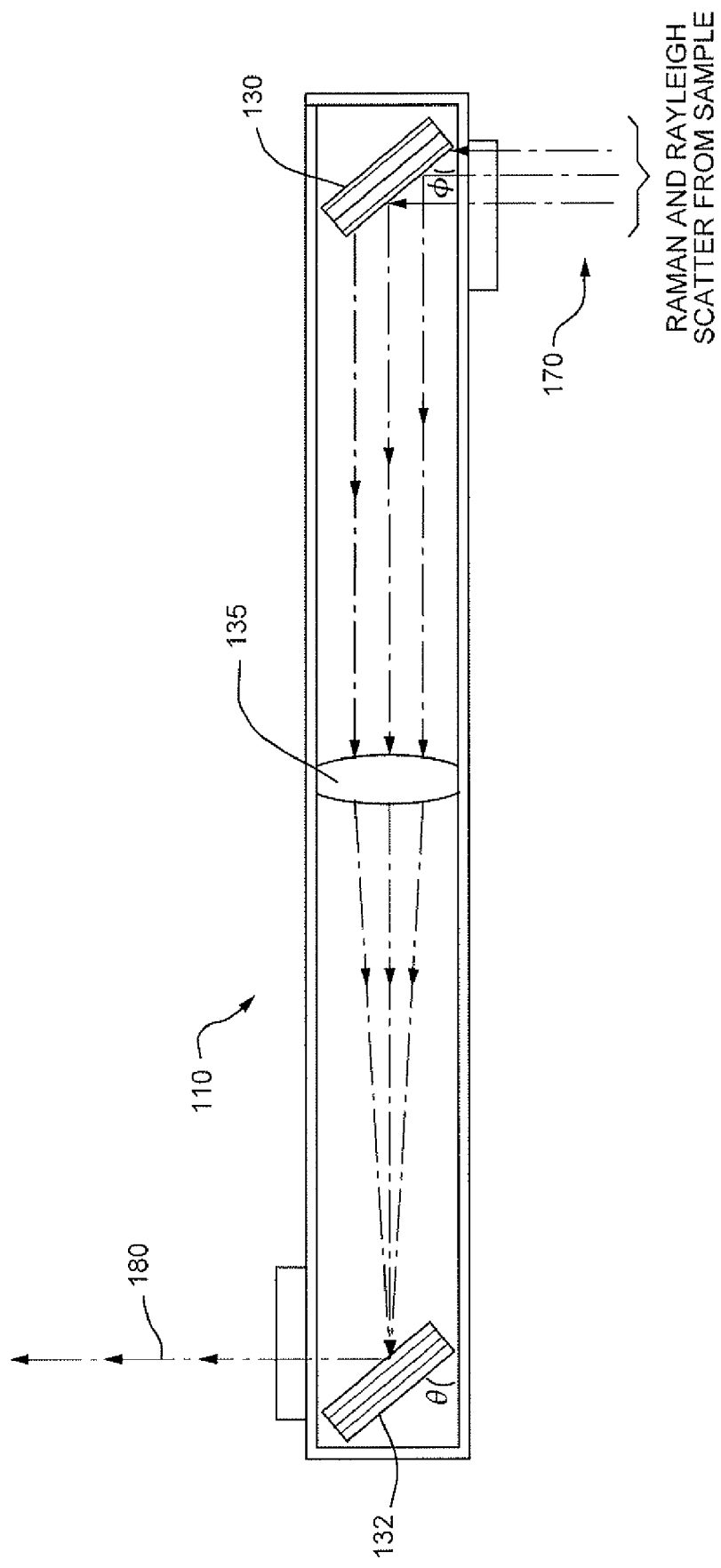
FIG. 7 is a cross section view of the Raman extender illustrating a return path of Rayleigh and Raman scatter from a sample to the Raman microspectrometer.

FIG. 6 is cross section perspective of the Raman extender 100 provided to illustrate the flow of light pulses from the laser source to the sample. In the embodiment of FIG. 6, a condensing lens 135 is disposed between mirrors 132 and 130 for focusing dispersed light waves from the laser onto a fixed point of the mirror 130. As is known in the art, the application of the laser light pulse to the sample causes resonance of the sample which results in Rayleigh and Raman scatter light. As shown in FIG. 7, the Rayleigh and Raman scatter is returned to the extender and reflected by mirror 130 onto condensing lens 135, which focuses the scatter onto mirror 132. Mirror 132 directs the scatter to the spectrometer for molecular analysis.

Figure 8:
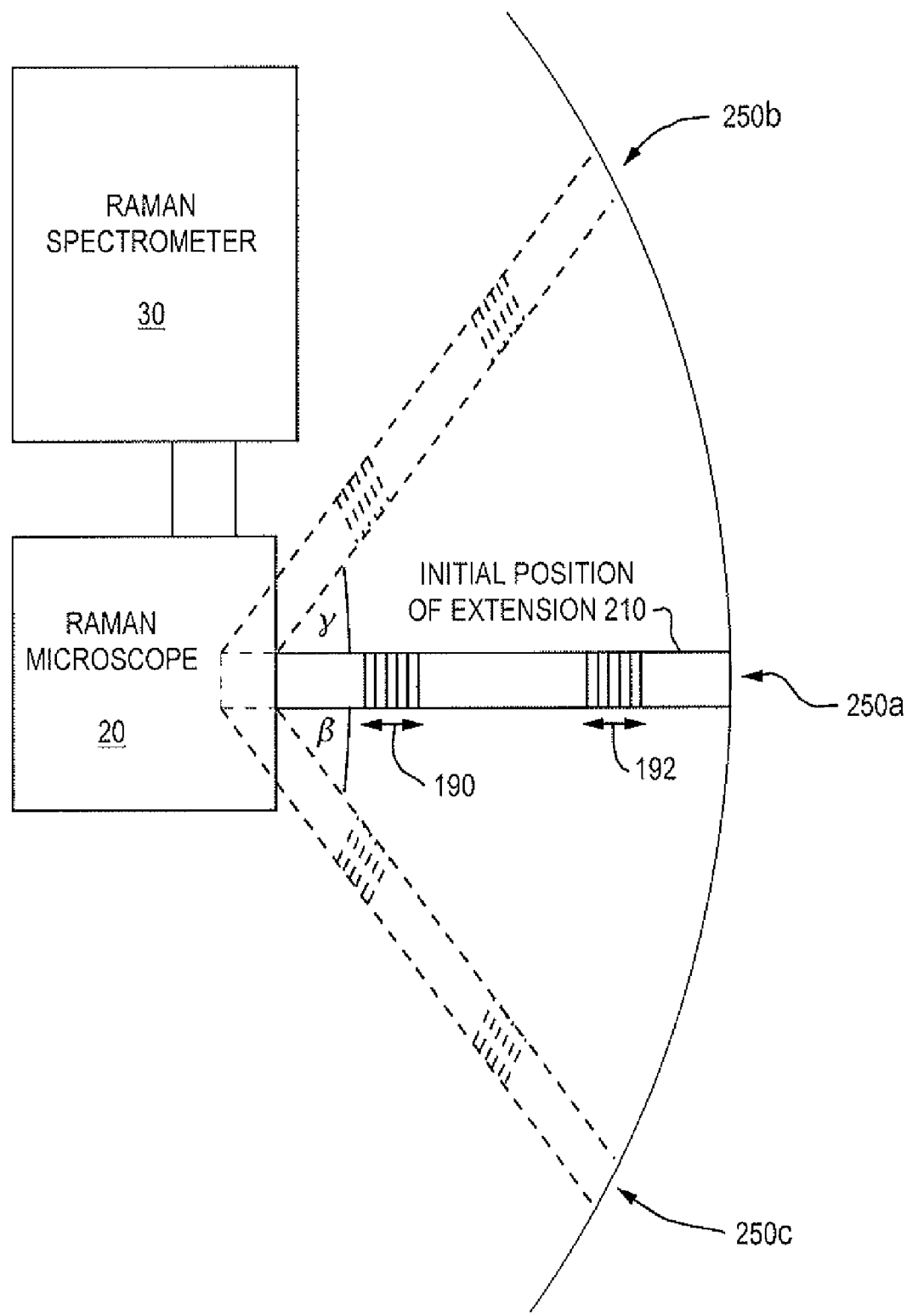
FIG. 8 is a top down view of a Raman microscope, spectrometer and extender of the present invention, illustrating various different positions and embodiments of the extender.

FIG. 8 is a top perspective view of alternate embodiments of the present invention in which the extender 110 is moveable. Movement of the extender 110 may be manually, or may be software controlled. For example, the mounting plate 116 (not shown) which couples the extender to the microscope may be rotatably software controlled to move the distal end of the extender to various positions along the x plane. In one embodiment, the extender comprises one or more bellows 190, 192, which enable telescoping of the extender, to extend or retract its length along the x-axis. In one embodiment of the invention, the movement of the extender is coordinated with movement of the supplemental stage, although it is not required that the two pieces move in concert. It can be appreciated, however, that such an arrangement increases the ability of the system to thoroughly analyze the sample and accommodate for different space constraints in a laboratory environment.

Figure 9:
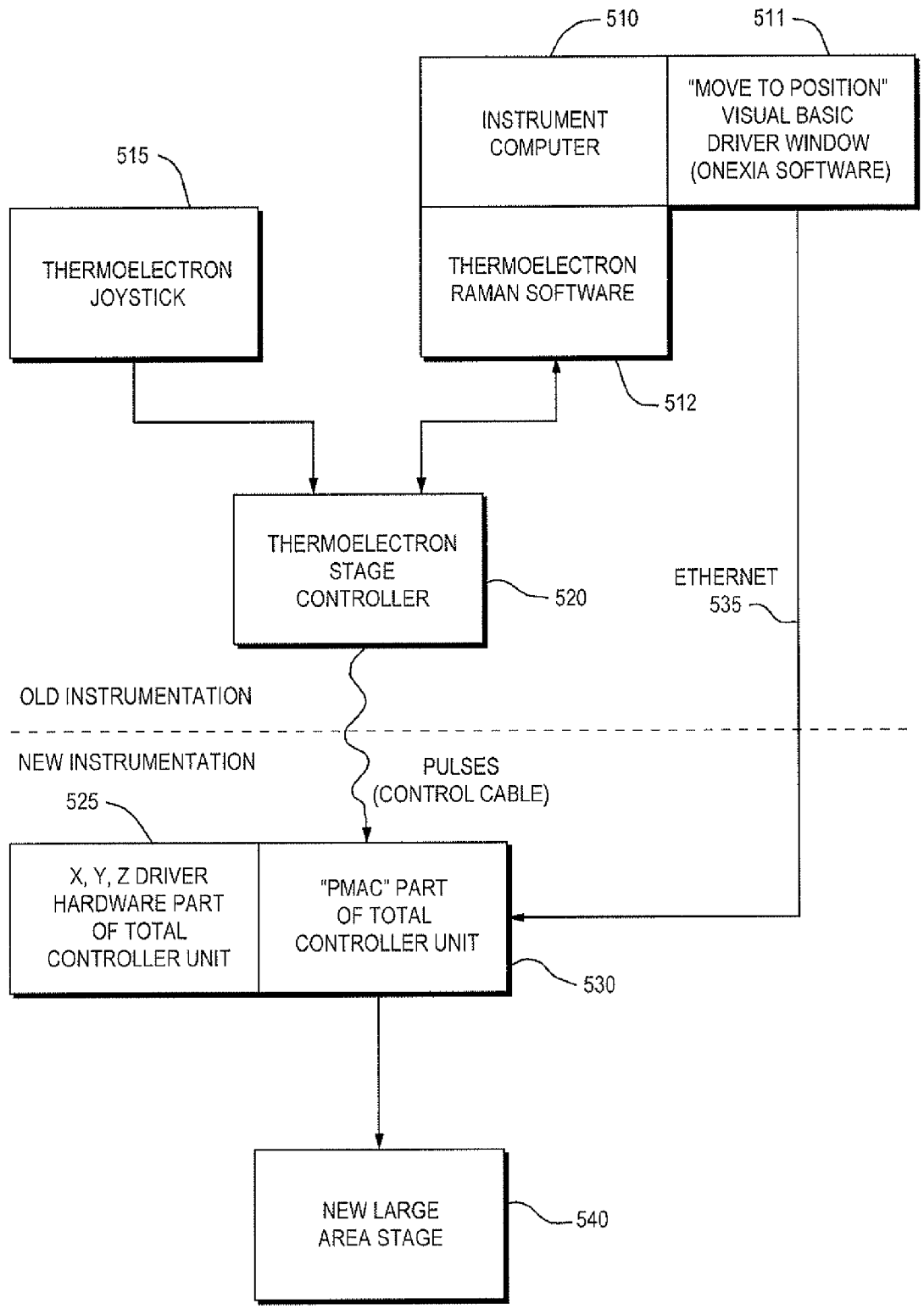
FIG. 9 is a block diagram illustrating exemplary software components of the improved Raman microspectrometer system of the present invention.

FIG. 9 is a block diagram illustrating functional blocks of a control system for the improved Raman microspectrometer of the present invention. The functional blocks may be implemented in software, hardware or a combination thereof. An instrument computer 510 includes a processor, display and user interface for performing spectral analysis of a sample. For example, the instrument computer provides an interface driver 511 that allows a user to input coordinates. Raman software 512 controls the application of laser pulses to the sample and displays the resultant frequency response. The stage may be moved in response to coordinate selection via control signals forwarded from an RS232 line to the stage controller 520. In addition, stage movement may be controlled manually by joystick 515. Movement signals from the joystick and the software 512 are interpreted by the stage controller 520.

In prior art designs, the output from the stage controller 520 was fed directly to the existing stage 22. However the present invention adds the Programmable Multi-Access Controller (PMAC) 530 which is used to drive the supplemental stage. The PMAC interprets movement information received either via the joystick 515 or directly from the driver 511 via Ethernet interface 535. The PMAC uses this information to identify an analysis coordinate of the oversized sample, and a travel driver 525 moves the sample to the desired coordinate. The positioning software 530, 525 thus interfaces with driver 511 to provide a positioning overlay that enables analysis of an oversized sample without modification of underlying Raman software 512.

Figure 10:
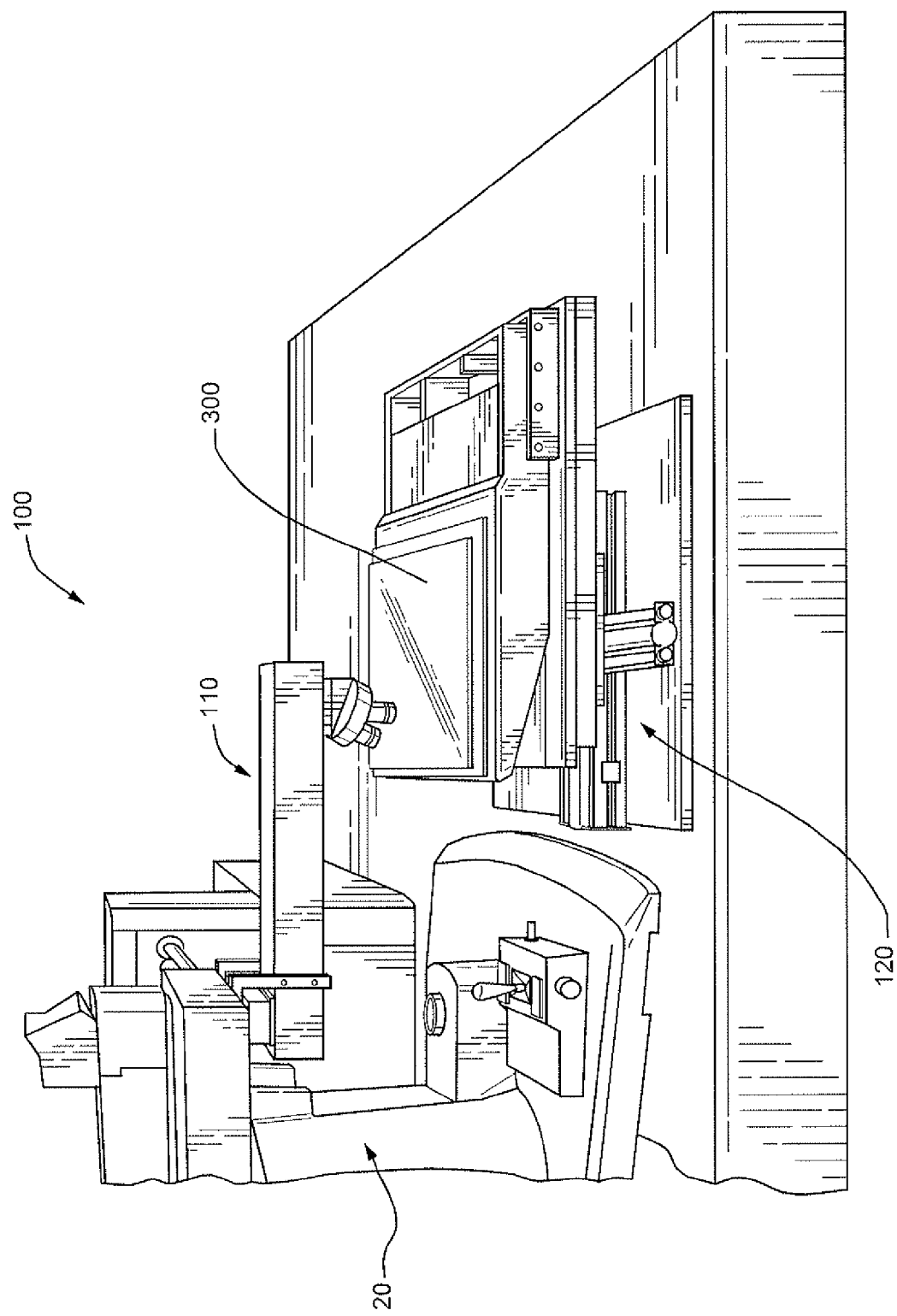
FIG. 10 is a diagram illustrating the analysis of a mammography panel using the improved Raman microspectrometer system of the present invention.
Figure 11:
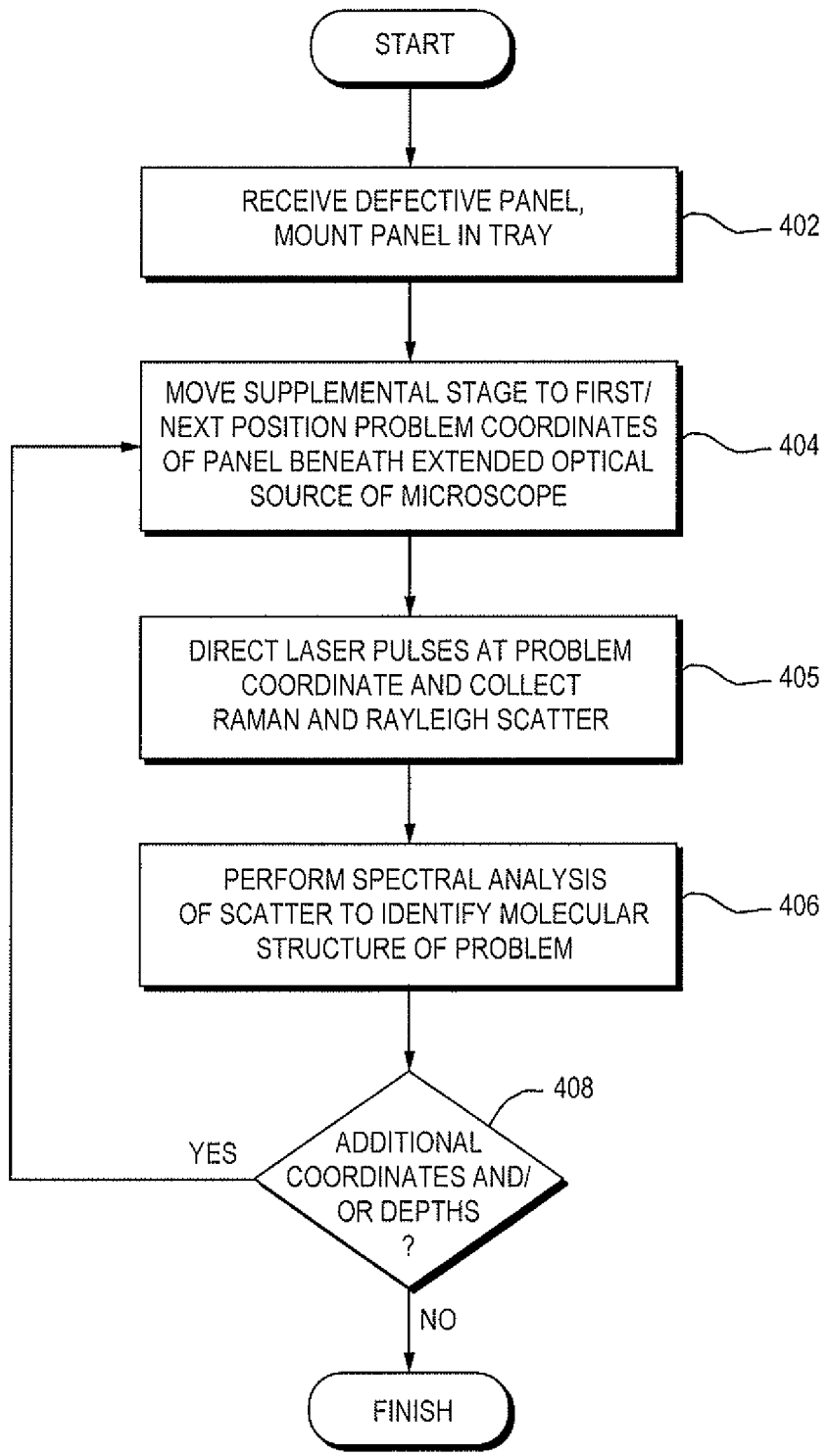
FIG. 11 is a flow diagram illustrating exemplary steps that may be performed in a defect analysis process for an oversized sample using the improved Raman microspectrometer of the present invention.
Figure 12:
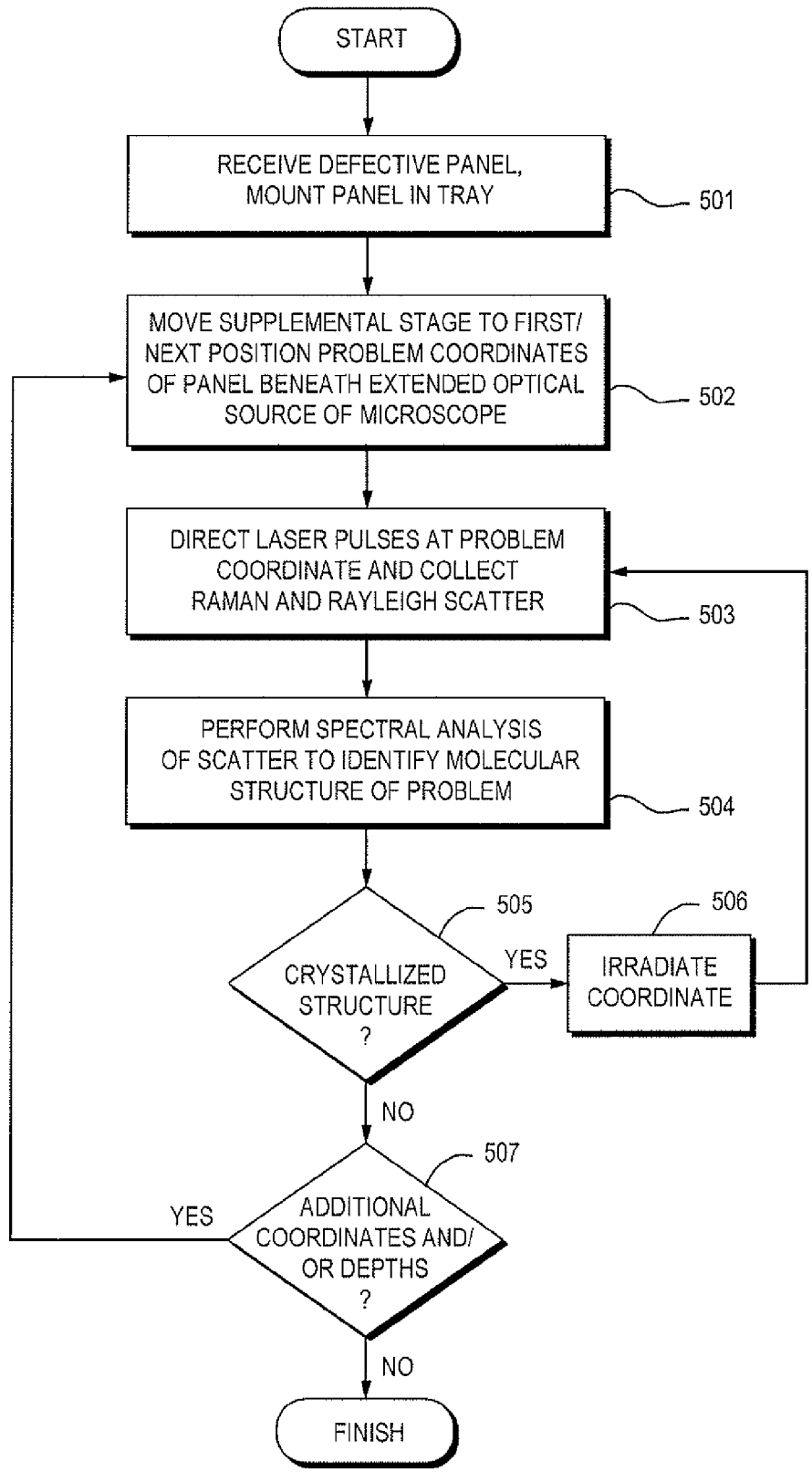
FIG. 12 is a flow diagram illustrating exemplary steps that may be performed in a defect analysis and repair process for an oversized sample using the improved Raman microspectrometer of the present invention.

FIG. 10 illustrates the improved Raman microspectrometer system of the present invention with a digital mammography panel 300 secured into tray mounts 127. As shown in FIG. 10 the entire mammography panel can be inserted into the tray 125, without the need to disassemble or otherwise deconstruct the panel. FIGS. 11 and 12 are flow diagrams which are provided to illustrate exemplary processes for analyzing and/or repair an oversized sample using the improved Raman microspectrometer of the present invention. For purposes of simplicity the processes will be described as directed at analysis and/or repair of a mammography panel, although the process is not limited to any particular type of oversized sample.

Referring now to FIG. 11, at step 402 a panel is received for analysis. The panel that is received may be a panel that is rejected by a manufacturing verification process as defective. In such embodiments, coordinates associated with one or more defects may be provided with the panel. During step 402, the panel is mounted in the tray, and the supplemental stage moves the panel to an initial location of the panel (for example, pixel 0,0).

At step 404 the supplemental stage moves the panel such that coordinates associated with the first defect are disposed beneath the distal orifice of the extender 110. At step 405, one or more laser pulses are directed at the sample. It should be noted that the ability to control z axis movement of the stage, in conjunction with the ability to manage the strength of the lens that is used allows analysis to be performed at different depths of the sample, thereby enabling a three dimensional molecular model of the structure to be built.

The laser light impinges upon a molecule of the sample and interacts with the electron cloud of the bonds of that molecule. The incident photon excites one of the electrons into a vibrational excited state, which generates Stokes Raman scattering. The Raman scatter together with Rayleigh scatter is returned on the optical channel to the spectrometer. At step 406 spectral analysis is performed on the scatter to identify the molecular structure of the sample. At step 408, it is determined whether there are additional coordinates and/or depths (at the same coordinate) that are to be analyzed. If so, the process returns to step 404 and the supplemental stage is repositioned.

The analysis is complete when all coordinates have been analyzed at all desired depths. Analysis can therefore be used to provide a multi-dimensional molecular information repository which can be used to identify manufacturing defects. Such defects may be, for example, additives that are erroneously deposited by an instrument during fabrication. Analysis can direct the manufacturers to investigate and correct process errors.

In addition the present invention can be used to correct certain identified defects and return the panels to the production line, thereby saving tens of thousands of dollars. For example, a common defect that is encountered in the mammography panel fabrication process is the crystallization of the amorphous selenium. Crystallization of selenium prohibits the free travel of holes and electrons in the selenium, thereby adding artifacts to resultant images. It is known in the art that amorphization of crystallized selenium can be achieved by application of a laser pulse having certain characteristics to the crystal structure. FIG. 12 illustrates exemplary steps that may be performed during an analysis and repair process of the present invention.

As in FIG. 11, at step 501 a panel is received from testing, placed onto the supplemental stage and the position of the stage is initialized. At step 502 the supplemental stage is moved to the first identified coordinate and laser pulses are directed at the coordinate. At step 504, spectral analysis of the Raman scatter is performed. At step 505 the frequency response associated with the Raman scatter is examined to determine whether the response indicates that the molecular structure is that of crystallized selenium. If it is determined that the structure is crystallized selenium, then at step 505 the molecule is irradiated to return the structure to amorphous. At step 503 the molecule may be examined to determine whether the irradiation was successful. The process continues until irradiation of each crystallized structure has been successfully completed.

Accordingly a system has been shown and described which extends the functionality of existing Raman microspectrometers to enable their use with oversized samples. The system enables a process for using the supplementary stage and Raman extension for non-destructive analysis and/or repair of oversized samples such as mammography imaging panels. Such an arrangement and process greatly reduces the costs of manufacturing of mammography panels by increasing the speed and accuracy of defect characterization, and allowing such characterization to be performed without destruction of the panel. Costs are further reduced because the system can also be used to perform quick repair of the panel and return of the panel to the production line.

Having described exemplary embodiments of the invention it should be understood that such embodiments are mere representative embodiments of a system which can be used to extend an optical reach of existing molecular analysis equipment to facilitate non-destructive analysis and repair of any type of sample. It should be noted that although the specification has referred to the use of the system with an oversized sample, the present invention is not limited to use with an oversized sample, but can also accommodate samples that can also be supported by the existing stage; thus there would be no need to swap the devices of the present invention to accommodate different size samples. In addition, although several embodiments of the extension have already been shown and described, other embodiments for example where the extender is flexible, or rotatable among any axis, are also contemplated herein. In essence, any device that can be used to change the optical path of a microspectrometer to direct laser pulses on a sample that is not placed in the provided tray could be substituted herein without affecting the scope of the invention. Further, although a supplemental stage has been shown having x and y rails, other devices for supporting and moving a sample in the x, y and z axes are considered as equivalents hereto, including a circular or otherwise rotatable tray mount, etc. Further, although exemplary steps have been described for performing an analysis and or repair process using the extension, it should be appreciated that such process is not limited for use with only the components described herein.

Having described exemplary embodiments of the invention, it should be appreciated that the present invention may be achieved using other components to perform similar tasks. As described above, some aspects of the invention may be controlled by a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware.

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

The invention claimed is:

1. A method for performing spectroscopy of a sample using a microspectrometer, wherein spectroscopy is performed across a desired analysis range of the sample and wherein a size of the desired analysis range exceeds at least one of a size and travel capability of a stage of the microspectrometer, the method comprising the step of:
controlling movement of a supplemental stage coupled to the microspectrometer to position an extended optical path of the microspectrometer over a point in the desired analysis range, wherein the sample is supported by the supplemental stage and wherein the movement of the sample enables spectral analysis of the sample at the point, including the step of extending an optical reach of the microspectrometer to provide the extended optical path by coupling an extender device to a microscope of the microspectrometer; and
controlling the microspectrometer to emit at least one laser pulse onto the point of the sample on the optical path and to perform spectral analysis of scatter wavelengths received in response to the laser pulse via the optical path.

2. The method of claim 1 wherein the step of controlling movement of the supplemental stage is performed in response to input at a user interface of the microspectrometer.

3. The method of claim 1 wherein the step of controlling movement of the supplemental stage is performed in response to manual movement of control logic associated with the stage, wherein a cable couples the control logic of the stage to the supplemental stage.

4. The method of claim 1 wherein the step of controlling movement of the supplemental stage controls movement of the stage in at least one of the x, y and z directions.

5. The method of claim 1 wherein the sample is an oversized sample having a size which exceeds the travel capabilities of the stage in at least one of an x or y dimension.

6. The method of claim 1 wherein the sample is a mammography panel.

7. The method of claim 1 further wherein the extender comprises a proximal orifice for transferring light between the microscope and the extended optical path and a distal orifice for transferring light between the optical path and the sample.

8. The method of claim 1 further including the steps of:
in response to spectral analysis indicating that the point comprises a defect, controlling the microspectrometer to irradiate the defect.

9. A method for repairing a defect in an oversized sample using a microspectrometer, wherein: the oversized sample exceeds a travel capability of a stage of the microspectrometer in at least one dimension, the oversized sample is positioned in a supplemental stage proximate to the microspectrometer and an optical reach of the microspectrometer is extended to dispose an extended optical path of the microspectrometer over the supplemental stage, the method including the step of:
extending the optical reach of the microspectrometer to provide the extended optical path by coupling an extender device to a microscope of the microspectrometer;
controlling movement of the supplemental stage to position the extended optical path of the microspectrometer over a defect in the sample; and
controlling the microspectrometer to irradiate the defect via the extended optical path.

10. The method of claim 9 wherein the step of controlling movement of the supplemental stage is performed in response to input at a user interface of the microspectrometer.

11. The method of claim 9 wherein the step of controlling movement of the supplemental stage is performed in response to manual movement of control logic associated with the stage, wherein a cable couples the control logic of the stage to the supplemental stage.

12. The method of claim 9 wherein the step of controlling movement of the supplemental stage controls movement of the stage in at least one of the x, y and z directions.

13. The method of claim 9 wherein the sample is a mammography panel.

14. The method of claim 9 wherein the extender comprises a proximal orifice for transferring light between the microscope and the extended optical path and a distal orifice for transferring light between the optical path and the sample.

* * * * *